United States Patent

[11] 3,591,146

| | | |
|---|---|---|
| [72] | Inventor | Fritz Sutter<br>Pratteln, Switzerland |
| [21] | Appl. No. | 738,322 |
| [22] | Filed | June 19, 1968 |
| [45] | Patented | July 6, 1971 |
| [73] | Assignee | Buss Aktiengesellschaft<br>Basel, Switzerland |
| [32] | Priority | June 22, 1967 |
| [33] | | Switzerland |
| [31] | | 9123/67 |

[54] DEVICE FOR ATTACHMENT TO MIXING AND KNEADING MACHINES
4 Claims, 1 Drawing Fig.

[52] U.S. Cl. ............................................. 259/10
[51] Int. Cl. ....................................... B01f 7/04,
B01f 15/00
[50] Field of Search............................... 259/6, 9,
10, 21, 41, 105; 18/12 SE, 12 SB

[56] References Cited
UNITED STATES PATENTS

| | | | |
|---|---|---|---|
| 2,080,327 | 5/1937 | McKinnis..................... | 259/6 |
| 2,213,381 | 9/1940 | Brown........................ | 259/6 |
| 2,982,990 | 5/1961 | Zomlefer..................... | 259/6 X |
| 2,991,503 | 7/1961 | Rietz......................... | 18/12 (SB) |

FOREIGN PATENTS

| 749,819 | 5/1933 | France........................ | 259/6 |

*Primary Examiner*—William I. Price
*Attorney*—Abraham A. Saffitz

ABSTRACT: An attachment device for a mixing and kneading machine having a rotating wormshaft comprises a casing which is adapted to be attached coaxially on the casing of the mixing and kneading machine and a separate and independently driven rotatable shaft with radially arranged blades therein and a first bearing. The attachment device casing is divided into two parts, the first being provided with a heating or cooling jacket and an outlet for the emergence of the mixture and the second including the first bearing and a second bearing for the shaft and means for adjusting the blades.

PATENTED JUL 6 1971
3,591,146
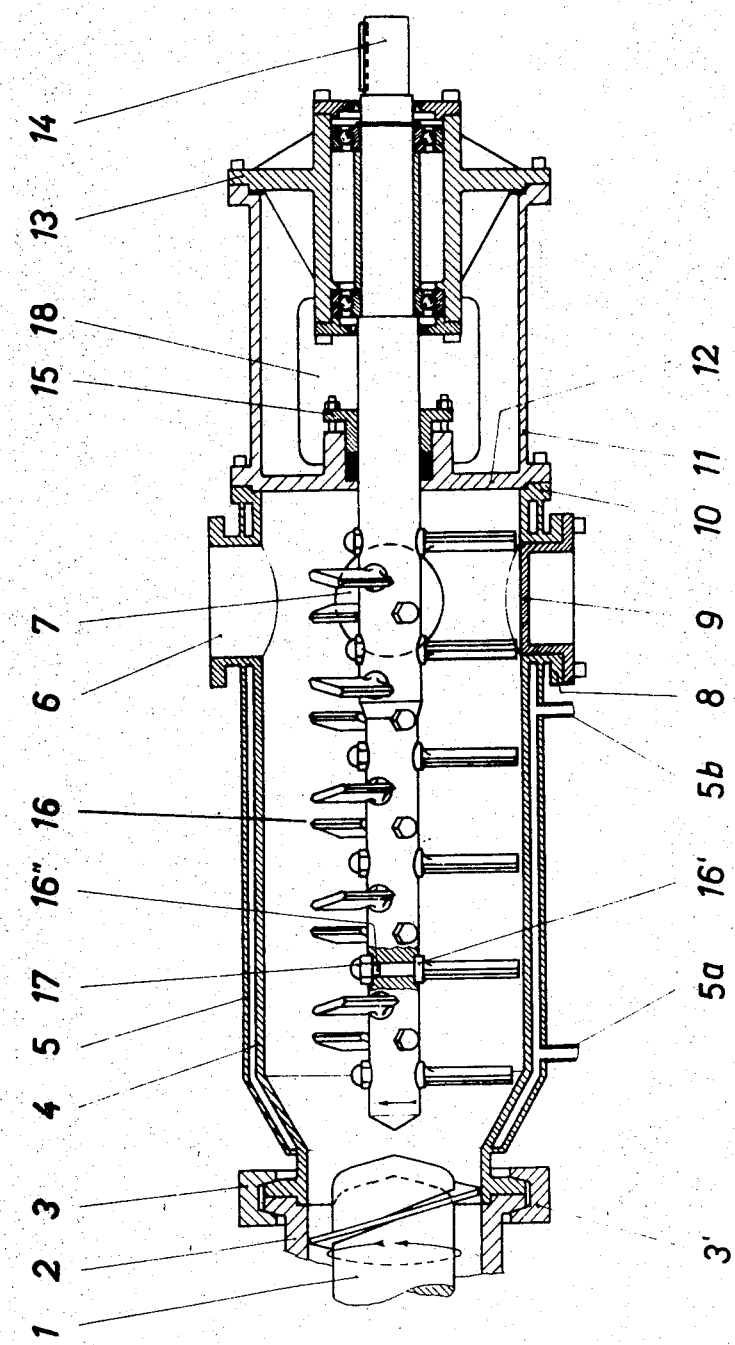
INVENTOR:
Fritz SUTTER
By Abraham A. Saffitz
ATTORNEY

DEVICE FOR ATTACHMENT TO MIXING AND KNEADING MACHINES

The present invention concerns a device for attachment to mixing and kneading machines for the further mixing treatment of crumbly or soft pastelike products.

Many products are treated in mixing and kneading machines which have a working shaft with worm blades, which shaft rotates and oscillates simultaneously. The present attachment is adapted to be associated with the conventional machine for mixing and kneading and provides advantages of continuous kneading.

The object of the present invention is to provide an attachment for conventional mixing and kneading devices used for the further treatment of crumbly or soft pastelike products in which there is provided a casing of the attachment, which is adapted to be flanged coaxially onto the mixing casing of the conventional and kneading device, said attachment casing enclosing a rotatable shaft with adjustable, radially arranged, blades, said shaft being driven independently from the shaft of the mixing and kneading device.

The invention will now be described further, by way of example only, with reference to the accompanying drawing which is partly in section and illustrates one embodiment of this invention.

The attachment device of the present invention has a casing which consists of a first part 4 and a second part 11. The first part 4 is flanged onto a casing 2 of a mixing and kneading device by means of clamps 3 and 3'. A rotatable shaft 14 is arranged in the two parts 4 and 11 of the casing in such a way that the bearing for the shaft 14 is disposed in the part 11 whilst the part 4 defines the working chamber. The part 4 of the casing is provided with a jacket 5, which receives either a heating or cooling medium. For this purpose, the jacket 5 has a feed aperture 5a and a drain aperture 5b for the heating or cooling medium. An outlet neck 6 for gases, an outlet neck 7 for the material, and a neck 8 for emptying and cleaning are provided on the part 4, the neck 8 being closed during operation of the device by a cover 9.

The shaft 14 has a plurality of diametrically arranged through holes, which receive blades 16. The blades 16 are each provided with a collar 16', a threaded portion 16" and a retaining nut 17. By loosening the nut 17 each of the blades 16 may be twisted in relation to the shaft 14 and fixed by tightening the nut 17.

The casing part 4 is coaxially connected to the casing part 11 by means of a flange 10 and releasable clamping members, which are not shown in detail. The casing part 11 has an end wall 12 wherein an adjustable stuffing box 15 is centrally disposed. The part 11 also has a wall 13 wherein bearings, (not shown in detail) are provided to carry the shaft 14. Two lateral windows 18 are also arranged in the part 11 so that the stuffing box 15 may be observed and adjusted if required. The shaft 14 is driven from a directly adjustable drive unit (not shown).

In operation, with the device attached to a mixing and kneading device, the product which is ejected from the kneader by the kneader shaft 1, is collected by the blades 16 and, with suitable adjustment of the blades, moved forward away from the kneader. Should the product still have a high viscosity, the blades 16 are so adjusted that the product is returned to the kneader so that it remains longer in the working zone thereof. The blades 16 in the vicinity of the wall 12 always work oppositely in the direction of the outlet neck 7. Should it not be desired for gas or steam to remain in the product, whether or not it has entered with it into the kneader or has been created therein by chemical reaction, degassing can take place in the attachment device. For this purpose the neck 6 is attached to a vacuum pump, the outlet neck 7 for the material being provided with a cellular sluice or a syphon and the shaft 14 is rotated slowly. Due to this action, all parts of the product in the chamber reach the top where the bubbles of gas can burst.

Should aeration of the product be desired for example with chocolate or porous building or insulating materials, gas or air is fed in via the neck 6. The discharge of the product again takes place via a cellular sluice or a syphon at the outlet neck 7. On aeration, the shaft 14 is adjusted to a high speed in order that the gas or air is forced into the product.

If heating or cooling is desired directly after kneading or mixing process, then a suitable medium is introduced into the jacket 5. With this, the difference in temperature between the medium and the product should be small due to the movement and large surface area.

If, in addition, the shaft of the device is firmly connected to the shaft of the preceding kneading machine, for example by being threaded thereon in the direction opposite to the direction of rotation, then additional scraper bolts may be built into the case 4, whereby the movement and mixing of the material during the oscillating and rotating movement is assisted in an advantageous manner.

The attachment device heretofore described can provide additional loosening of the product should the latter leave the mixing and kneading device in large lumps. Furthermore an easing of the product, if necessary cutting off the supply of air thereto, may take place to promote such actions as physical swelling biological fermentation or chemical reactions. Additional substances may also be mixed in, which may need to be added only after the kneading process.

What we claim is:

1. An attachment device for a mixing and kneading machine having a casing and a rotating wormshaft, said attachment comprising: a casing adapted to be flangedly attached coaxially on the casing of said mixing and kneading device, a separate rotatable shaft which is independently driven, driving means to drive the shaft of said attachment device, radially arranged blades in said rotatable shaft of said attachment device, said rotatable shaft being provided with a first bearing in said attachment casing, said attachment casing being divided into two parts, the first part of which is provided with a heating or cooling jacket surrounding the casing and an outlet from which the mixture emerges and the second part including said first bearing for said attachment shaft and a second bearing for said shaft which is disposed between the first and second parts and adjustment means for said blades in the shaft of said attachment.

2. An attachment device as claimed in claim 1, wherein the first part of said casing has an outlet neck for expelling gas from the mixture and a further outlet for emptying and cleaning, said further cleaning outlet being provided with a cover which is closed during a mix.

3. An attachment device as claimed in claim 1, wherein said radial blades are secured to said shaft by threaded nut means and wherein a plurality of diametric bores are provided in the shaft of said blades.

4. An attachment device as claimed in claim 2, wherein the said attachment casing has an end wall, a stuffing box is centrally disposed in said end wall, and said second bearing is carried by said end wall.